(12) United States Patent
Rogan

(10) Patent No.: US 11,516,642 B2
(45) Date of Patent: *Nov. 29, 2022

(54) DIFFERENT PROFILES FOR SELECTING DIFFERENT NETWORK INTERFACES FOR COMMUNICATIONS OF AN ELECTRONIC DEVICE

(71) Applicant: BlackBerry Limited, Waterloo (CA)

(72) Inventor: Michael John Rogan, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,059

(22) Filed: Mar. 8, 2021

(65) Prior Publication Data

US 2021/0195391 A1 Jun. 24, 2021

Related U.S. Application Data

(63) Continuation of application No. 16/540,950, filed on Aug. 14, 2019, now Pat. No. 10,959,076.

(51) Int. Cl.
| | | |
|---|---|---|
| *H04W 4/60* | (2018.01) | |
| *H04W 8/18* | (2009.01) | |
| *H04W 88/06* | (2009.01) | |
| *H04L 12/46* | (2006.01) | |
| *H04L 67/30* | (2022.01) | |

(Continued)

(52) U.S. Cl.
CPC ........... *H04W 4/60* (2018.02); *H04L 12/4641* (2013.01); *H04L 67/30* (2013.01); *H04W 8/18* (2013.01); *H04W 8/183* (2013.01); *H04W 92/10* (2013.01); *H04W 4/50* (2018.02); *H04W 88/06* (2013.01)

(58) Field of Classification Search
CPC ........... H04W 4/00; H04W 4/50; H04W 4/60; H04W 4/70; H04W 4/80; H04W 8/18–205; H04W 12/00514; H04W 52/0258; H04W 52/0264; H04W 52/0267; H04W 52/28; H04W 76/15–16; H04W 80/12; H04W 88/02–06; H04W 92/08; H04W 92/10; H04L 12/4641; H04L 67/30

See application file for complete search history.

(56) References Cited

U.S. PATENT DOCUMENTS

| | | |
|---|---|---|
| 7,065,367 B2 | 6/2006 | Michaelis |
| 8,019,296 B1 | 9/2011 | Durig |

(Continued)

OTHER PUBLICATIONS

Manalo, Amboy, Gadget Hacks IOS & IPhone, Everthing You Need to Know About Dual SIMs on the iPhone Xs, Xs Max & Xr, Dec. 13, 2018 (7 pages).

(Continued)

*Primary Examiner* — San Htun
(74) *Attorney, Agent, or Firm* — Trop, Pruner & Hu, P.C.

(57) ABSTRACT

In some examples, an electronic device includes a plurality of network interfaces to communicate over respective different networks, and a storage medium to store information associating a first application of the electronic device with a first profile, and associating a second application of the electronic device with a second profile. The first profile selects a first network interface of the plurality of network interfaces to use for communications, and the second profile selects a second network interface of the plurality of network interfaces to use for communications.

17 Claims, 3 Drawing Sheets

(51) Int. Cl.
  *H04W 92/10* (2009.01)
  *H04W 4/50* (2018.01)

(56) References Cited

U.S. PATENT DOCUMENTS

| | | | |
|---|---|---|---|
| 2005/0091357 A1 | 4/2005 | Krantz | |
| 2010/0311404 A1* | 12/2010 | Shi | H04W 4/60 |
| | | | 455/419 |
| 2012/0106443 A1 | 5/2012 | Chen | |
| 2013/0023262 A1* | 1/2013 | Zhang | H04W 24/00 |
| | | | 455/418 |
| 2013/0219465 A1* | 8/2013 | Tse | H04W 12/08 |
| | | | 726/3 |
| 2013/0329639 A1 | 12/2013 | Wietfeldt | |
| 2014/0071895 A1 | 3/2014 | Bane | |
| 2014/0220952 A1* | 8/2014 | Holtmanns | H04W 4/50 |
| | | | 455/418 |
| 2015/0146707 A1* | 5/2015 | Jung | H04W 12/068 |
| | | | 370/338 |
| 2015/0237497 A1 | 8/2015 | Chen | |
| 2016/0373958 A1* | 12/2016 | Cao | H04W 12/02 |
| 2017/0134298 A1 | 5/2017 | Walke | |
| 2018/0007211 A1 | 1/2018 | Pieda | |
| 2019/0098487 A1* | 3/2019 | Boettger | H04W 28/065 |

OTHER PUBLICATIONS

Senouci et al., An Evidential Approach for Network Interface Selection in Heterogeneous Wireless Networks, Dec. 4-8, 2016 (7 pages).
Pingplotter, Knowledge Base, Specifying which network interface to use, 2019 (4 pages).
European Patent Office, Extended European Search Report for Appl. No. 20174802.7 dated Nov. 10, 2020 (7 pages).
European Patent Office, Communication pursuant to Article 94(3) EPC for Appl. No. 20174802.7 dated Aug. 19, 2022 (5 pages).

* cited by examiner

DIFFERENT PROFILES FOR SELECTING DIFFERENT NETWORK INTERFACES FOR COMMUNICATIONS OF AN ELECTRONIC DEVICE

CROSS REFERENCE TO RELATED APPLICATION

This is a continuation of U.S. application Ser. No. 16/540,950, filed Aug. 14, 2019, U.S. Pat. No. 10,959,076, which is hereby incorporated by reference.

BACKGROUND

An electronic device can include various applications to allow a user to perform different tasks. For example, the user may use the electronic device both in a work environment and outside of work (referred to as a "personal environment" of the user).

BRIEF DESCRIPTION OF THE DRAWINGS

Some implementations of the present disclosure are described with respect to the following figures.

Figure 1:
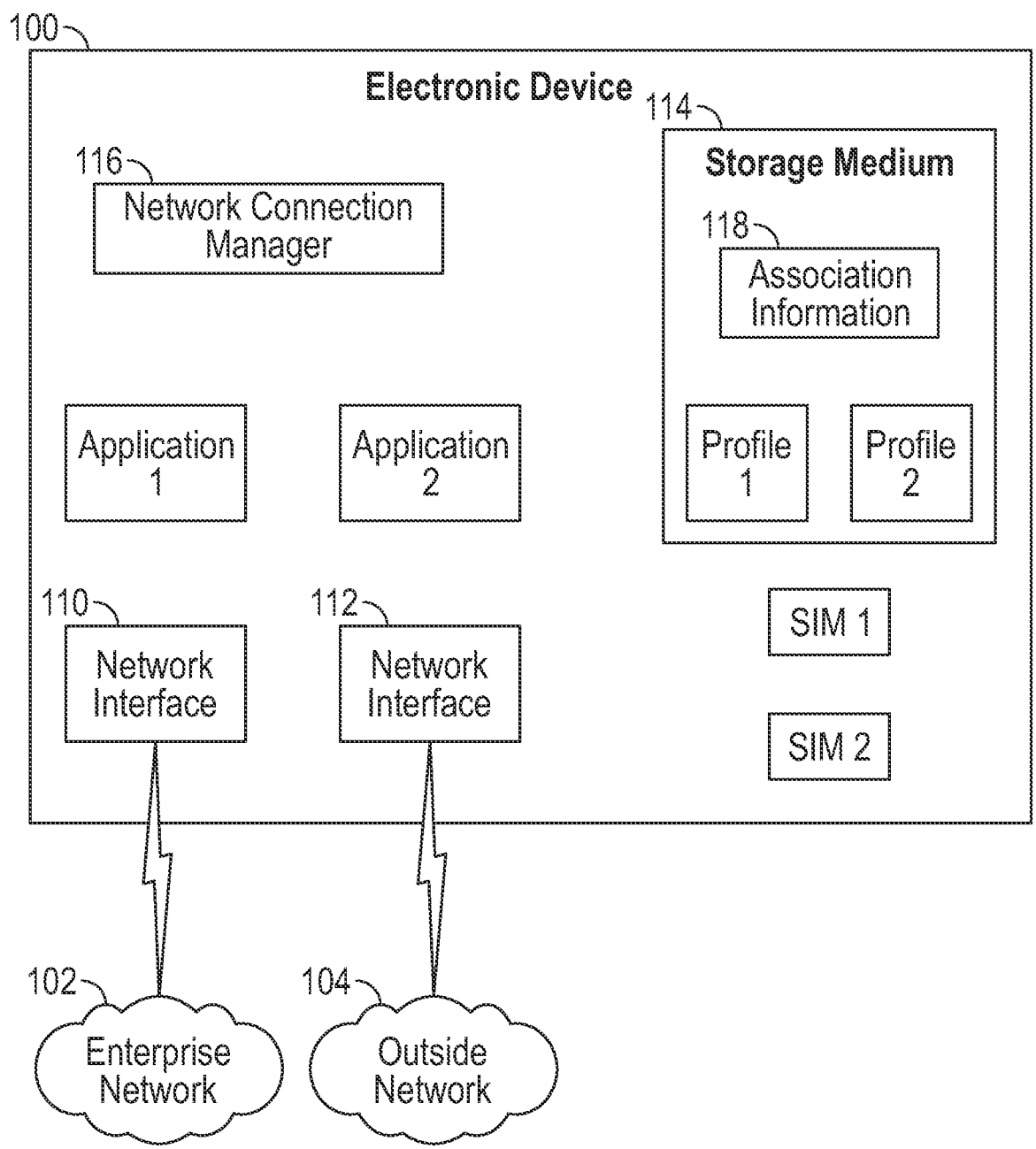
FIG. 1 is a block diagram of an example arrangement according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An "electronic" device can refer to any or some combination of the following: a desktop computer, a notebook computer, a tablet computer, a smartphone, a game appliance, a wearable device (e.g., a smart watch, smart eyeglasses, a head-mounted device, etc.), or any other electronic device that can be used by a user.

An "application" can refer to any program in the form of machine-readable instructions that a user can interact with.

In some examples, an electronic device can have different applications used by a user for different purposes. For example, applications can include social media applications that are used to access social media sites, gaming applications to perform online gaming sessions, dating applications for accessing dating sites, and so forth. Applications can also include productivity applications, such as to generate word processing documents, spreadsheets, presentations, and so forth. Applications can also include browsing applications to allow a user to browse various sites, such as websites.

Furthermore, in examples where the electronic device can be used by the user both in a work environment and in a personal environment of the user, the electronic device can include applications used by the user for work purposes, such as to access resources of an enterprise, including accessing information sources of the enterprise, accessing programs or machines of the enterprise, interacting with colleagues in the enterprise, and so forth.

An "enterprise" can refer to a company, a government agency, an educational organization, a home, or any other type of organization.

In examples where an electronic device can be used by a user in both a work environment and a personal environment, the use of certain applications for personal reasons by the user may pose a security risk when the user is at work. For example, when at work, the user may access an external resource using the enterprise's wireless network (referred to as "enterprise network"), such as a wireless local area network (WLAN), an Ethernet network, or any other type of wired or wireless network. For example, if a user uses the user's electronic device to access a social media site or browse public websites using the enterprise network, there can be a risk that malware or an unauthorized entity (e.g., a human, a machine, or a program) may attempt to hack into the enterprise network through the electronic device to gain access to confidential information or to introduce malware into systems connected to the enterprise's network, or to otherwise perform an unauthorized operation in a system coupled to the enterprise's network.

In accordance with some implementations of the present disclosure, and as shown in FIG. 1, an electronic device 100 that includes multiple applications (including application 1 and application 2) can be used in a work environment and a personal environment, respectively, of a user of the electronic device 100.

A "work environment" can refer to an environment where the user is engaged in activities when working for an enterprise. For example, the electronic device used in the work environment may be located physically at the facilities of the enterprise, or alternatively, may be external of the physical facilities of the enterprise but is coupled to the enterprise network using a secure connection, such as a virtual private network (VPN) or other type of secure connection. The electronic device used in the work environment can refer to the electronic device being used for purposes of work for the enterprise.

The electronic device used in the personal environment can refer to when the electronic device is being used for any purpose other than for work.

Although two applications are shown in FIG. 1, it is noted that in other examples, there can be more than two applications for use in the work environment, the personal environment, and possibly other environments, respectively. In the example of FIG. 1, application 1 is executable in the electronic device 100 to access resources of an enterprise network 102, which is the network of an enterprise at which the user of the electronic device 100 works. Generally, an "enterprise network" can refer to any network that is considered a secure network to be protected against unauthorized access.

Application 2 is executable in the electronic device 100 to access resources of an outside network 104. As used here, an "outside network" can refer to any network that is separate and distinct from the enterprise network 102. For example, the outside network 104 can include a public WLAN (such as a WLAN in a coffee shop, a WLAN in a hotel, a WLAN at an airport, a WLAN that is available generally in a geographic region such as a city, and so forth), a cellular network, or any other type of wired or wireless network.

The enterprise network 102 can include a secure WLAN that is accessible by the electronic device 100 only if the appropriate credentials are provided by the electronic device 100. A credential can include a username and password, a certificate, a key, or any other type of credential.

The electronic device 100 further includes a network interface 110 and a network interface 112. Although just two network interfaces are shown, in other examples, the electronic device can include more than two network interfaces.

A "network interface" can refer to any communication component (or arrangement of components) used by the electronic device 100 to access a respective network. The network interface can include network interface hardware, such as a network interface controller (NIC), and module(s) that is (are) used to allow communication over a respective network according to one or more protocols, such as an Ethernet protocol, an Internet Protocol (IP), a cellular network protocol, and so forth. A "module" can refer to a hardware component or to software.

In some examples, the network interface 110 is allocated for communication over the enterprise network 102 (but not over the outside network 104), while the network interface 112 is allocated for communication over the outside network 104 (but not over the enterprise network 102).

Thus, according to some examples, application 1 accesses the enterprise network 102 using the network interface 110 to interact with a resource of the enterprise network 102, and application 2 accesses the outside network 104 using the network interface 112 to interact with a resource of the outside network 104.

An application interacting with a resource of a network can refer to the application accessing a resource connected to the network, such as a storage resource that includes an information repository, a web resource, a network resource, and so forth. Accessing a resource of an application can also refer to a user of the electronic device 100 interacting with another user that is communicating over the network using another different electronic device.

For example, the network interface 110 can be allocated for application 1 to perform communications over the enterprise network 102 at the user's work, while the network interface 112 can be allocated for application 2 to perform communications over the outside network 104, such as to access public websites, gaming sites, dating sites, social media sites, or any other resource that is not part of the enterprise network 102.

The electronic device 100 further includes a storage medium 114, which can be implemented using one or more storage devices, such as any one or more of the following: a memory device (e.g., a dynamic random access memory or DRAM device, a static random access memory or SRAM device, a flash memory device, a disk-based storage device, etc.).

The storage medium 114 can store various profiles, which in the example of FIG. 1 includes profile 1 and profile 2. A "profile" can refer to any data structure containing information that is usable by the electronic device 100 to control communications of an application over a respective network, such as the enterprise network 102 or the outside network 104.

In accordance with some implementations of the present disclosure, the electronic device 100 includes a network connection manager 116, which can be implemented using machine-readable instructions or a hardware processing circuit, such as any or some combination of the following: a microprocessor, a core of a multi-core microprocessor, a microcontroller, a programmable integrated circuit, a programmable gate array, a digital signal processor, or another hardware processing circuit. In some examples, the network connection manager 116 can be part of an operating system (OS) of the electronic device 100, or can be separate from the OS.

The network connection manager 116 uses the profiles stored in the storage medium 114 to control which network interface a corresponding application is to use for accessing a corresponding network.

For example, the network connection manager 116 can access association information 118 stored in the storage medium, where the association information 118 associates different applications with respective different profiles. For example, the association information 118 can associate application 1 with profile 1, and can associate application 2 with profile 2.

Although just two profiles are shown in FIG. 1, it is noted that the storage medium 114 can store additional profiles in other examples, where the additional profiles can be associated with other respective applications. The association information 118 can associate one or more applications with a given profile.

Profile 1 contains information that selects the network interface 110 to be used for communications, and profile 2 contains information that selects the network interface 112 to perform communications. By associating a respective profile with a given application, the association information 118 can cause the given application to use a specific network interface to communicate over a corresponding network.

As a result, enhanced security can be provided to protect against an unauthorized access or an unauthorized operation on the enterprise network 102 due to use of an application in the electronic device 100 (such as application 2) to interact with a resource that is outside of the enterprise network 102.

Figure 2:
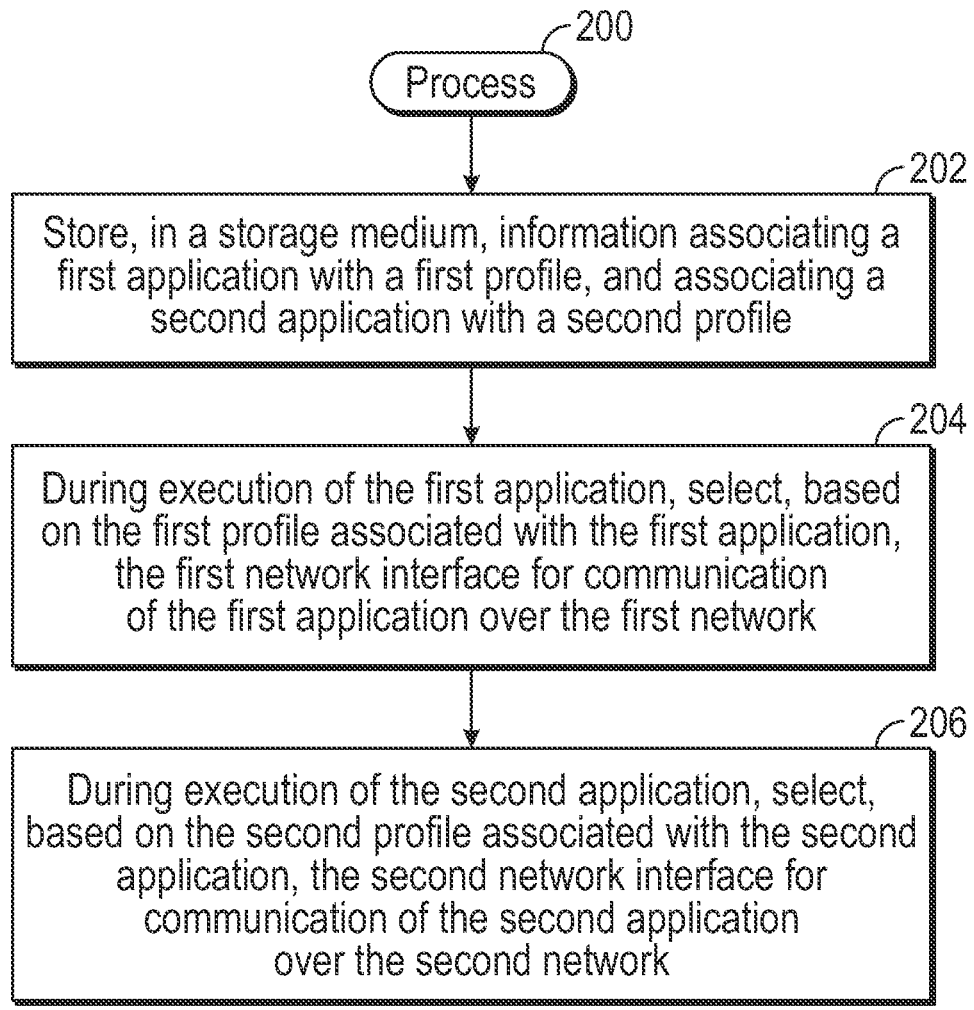
FIG. 2 is a flow diagram of a process according to some examples.

FIG. 2 is a flow diagram of a process 200 according to some examples. The process 200 can be performed by the electronic device 100, for example.

The process 200 stores (at 202), in a storage medium (e.g., 114 in FIG. 1), information (e.g., 118 in FIG. 1) associating a first application of the electronic device with a first profile (e.g. profile 1 in FIG. 1), and associating a second application of the electronic device with a second profile (e.g., profile 2 in FIG. 2). The first profile selects a first network interface (e.g., 110 in FIG. 1) of a plurality of network interfaces to use for communications, and the second profile selects a second network interface (e.g., 112 in FIG. 1) of the plurality of network interfaces to use for communications.

The profiles stored in the storage medium may be pre-stored in the storage medium of the electronic device. Alternatively, the profiles can be stored in the storage medium during setup of the electronic device, during a registration or onboarding process of the electronic device, or at any other time. The profiles stored in the storage medium can also be updated, such as from a remote source.

During execution of the first application, the process 200 selects (at 204), based on the first profile associated with the first application, the first network interface for communication of the first application over the first network. As discussed above, the association of the first profile with the first application can be based on use of association information (e.g., 118 in FIG. 1) that associates different profiles with respective different applications.

The network connection manager 116 uses the association information and the profiles to control which network interface is to be used by which application when accessing a resource over a network.

During execution of the second application, the process 200 selects (at 206), based on the second profile associated with the second application, the second network interface for communication of the second application over the second network.

In some examples, the first profile specifies use of a first service set identifier (SSID) from among a plurality of SSIDs for communications, and the second profile specifies use of a second SSID from among the plurality of SSIDs for communications. An SSID includes a name of a WLAN. When a profile specifies use of a given SSID, the network connection manager 116 is able to identify which network interface is to be used for accessing the WLAN identified by the given SSID.

In further examples, the first profile specifies that the first application is to use a first VPN for communications. A VPN can refer to a virtual network that is protected by a security mechanism that prevents an unauthorized entity to access data communicated over the VPN. When a profile specifies use of a given VPN, the network connection manager 116 is able to identify which network interface is to be used by the corresponding application for accessing the VPN.

In some examples, the second profile specifies that the second application is to use a second VPN for communications. Alternatively, the second profile specifies that the second application is to not use of a VPN for communications.

In some examples, the electronic device 100 of FIG. 1 can include multiple subscriber identity modules (SIMs), such as SIM 1 and SIM 2. A SIM can include an integrated circuit that security stores the international mobile subscriber identity (IMSI) or another user identity or device identity to be used to identify and authenticate a subscriber in a cellular network. Alternatively, a SIM can refer to an embedded SIM (eSIM), which is a digital file. The different SIMs correspond to different wireless networks. For example, SIM 1 includes information for authenticating a subscriber to a first wireless network, and SIM 2 includes information for authenticating a subscriber to a second wireless network.

In examples where the electronic device 100 includes multiple SIMs, the first profile can specify use of a first SIM from among the multiple SIMs for communications, and the second profile can specify use of a second SIM from among the multiple SIMs for communications. When a profile specifies use of a given SIM, the network connection manager 116 is able to identify which network interface is to be used for accessing a respective network using the given SIM.

In further examples, the first profile can specify use or prohibit the use of data over a specific wireless network when the electronic device is roaming. For example, the first profile can specify that use of data over the enterprise network 102 is prohibited when the electronic device 100 has roamed outside the enterprise network 102. This would prevent the use of the network interface 110 when the electronic device 100 has roamed outside the enterprise network 102, in which case an application would use the other network interface 112 to establish communication over the outside network 104.

In alternative examples, the network interface 110 is a WLAN interface, and the network interface 112 is a network interface (e.g., a cellular interface) different from the WLAN interface. In such examples, the second profile can specify that the second application is to not use the WLAN interface, which would case the second application to use the non-WLAN interface.

In other examples, the network interface 110 is a cellular interface, and the network interface 112 is a network interface (e.g., a WLAN interface) different from the cellular interface. In such examples, the second profile can specify that the second application is to not use the cellular interface, which would case the second application to use the non-cellular interface.

In further examples, an enterprise may have a policy prohibiting the use of the enterprise network 102 for certain activities (dating applications, games, etc.) on the user's personal device, but the user still wants to use the enterprise network 102 for work related matters and other activities. The profiles can prevent the dating applications and gaming applications from using the enterprise network 102, but can allow these applications to use the outside network 104.

Figure 3:
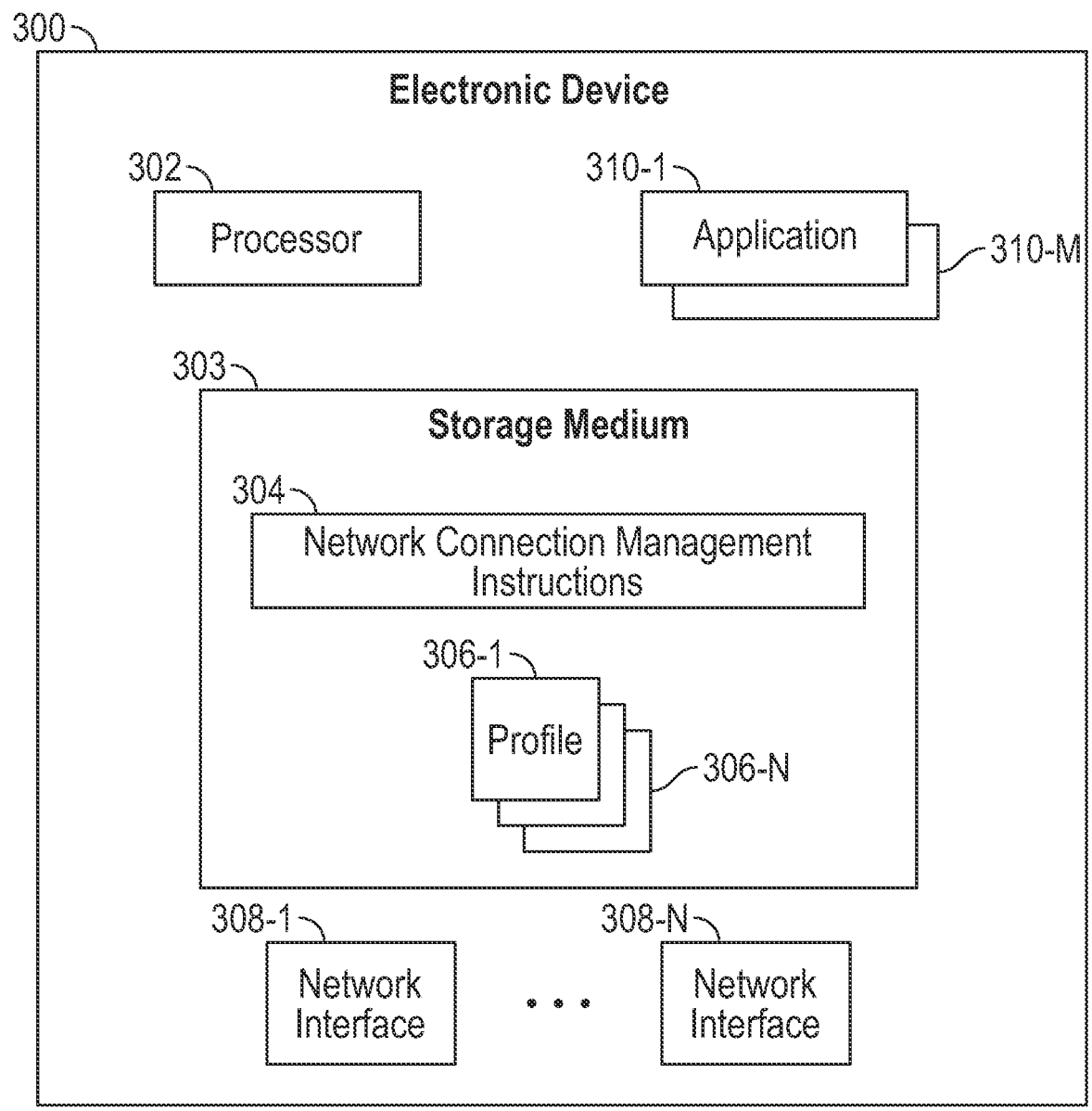
FIG. 3 is a block diagram of an electronic device according to some examples.

FIG. 3 is a block diagram of an electronic device 300 that includes one or more hardware processors 302. The electronic device 300 further includes a non-transitory machine-readable or computer-readable storage medium 303 that stores machine-readable instructions to perform various tasks.

For example, the machine-readable instructions can include network connection management instructions 304 to use profiles 306-1 to 306-N to determine which network interfaces 308-1 to 308-N (N>2) in the electronic device 300 are to be used for communications of respective applications 310-1 to 310-M (M>2, where M can be the same as or different from N).

The storage medium 303 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
  a plurality of network interfaces to communicate over respective different networks;
  a storage medium to store association information associating a first application of the electronic device with a first profile, and associating a second application of the electronic device with a second profile, wherein the first profile selects a first network interface of the plurality of network interfaces to use for communications based on the first profile containing first information specifying use of a first subscriber identity module (SIM) from among a plurality of SIMs and specifying use of a first service set identifier (SSID) from among a plurality of SSIDs for communications, and wherein the second profile selects a second network interface of the plurality of network interfaces to use for communications based on the second profile containing second information specifying use of a second SIM from among the plurality of SIMs and specifying use of a second SSID from among the plurality of SSIDs for communications; and at least one processor configured to:

during execution of the first application, select, based on the first profile associated by the association information with the first application, the first network interface for communication of the first application over a first network, the selecting of the first network interface responsive to the first profile containing the first information specifying use of the first SIM and specifying use of the first SSID, and during execution of the second application, select, based on the second profile associated by the association information with the second application, the second network interface for communication of the second application over a second network, the selecting of the second network interface responsive to the second profile containing the second information specifying use of the second SIM and specifying use of the second SSID.

2. The electronic device of claim 1, wherein the first profile specifies that the first application is to use a virtual private network (VPN) for communications.

3. The electronic device of claim 2, wherein the second profile specifies that the second application is to not use a VPN for communications.

4. The electronic device of claim 1, wherein the plurality of SIMs correspond to different wireless networks.

5. The electronic device of claim 1, wherein the first profile specifies communication or prohibits communication of data over a wireless network when the electronic device is roaming.

6. The electronic device of claim 1, wherein the first network interface comprises a wireless local area network (WLAN) interface to communicate over a WLAN.

7. The electronic device of claim 6, wherein the second profile specifies that the second application is to not use the WLAN interface.

8. The electronic device of claim 1, wherein the first network interface comprises a cellular network interface to communicate over a cellular network.

9. The electronic device of claim 8, wherein the second profile specifies that the second application is to not use the cellular network interface.

10. A method of an electronic device, comprising:

storing, in a storage medium, information associating a first application of the electronic device with a first profile, and associating a second application of the electronic device with a second profile, wherein the first profile contains first information specifying use of a first subscriber identity module (SIM) from among a plurality of SIMs for communications and specifying use of a first service set identifier (SSID) from among a plurality of SSIDs for communications, and wherein the second profile contains second information specifying use of a second SIM from among the plurality of SIMs for communications and specifying use of a second SSID from among the plurality of SSIDs for communications;

during execution of the first application, selecting, based on the first profile associated with the first application, a first network interface of a plurality of network interfaces for communication of the first application over a first network responsive to the first profile containing the first information specifying use of the first SIM and specifying use of the first SSID, and during execution of the second application, selecting, based on the second profile associated with the second application, a second network interface of the plurality of network interfaces for communication of the second application over a second network responsive to the second profile containing the second information specifying use of the second SIM and specifying use of the second SSID.

11. The method of claim 10, wherein the first profile specifies that the first application is to use a virtual private network (VPN) for communications, and wherein the second profile specifies that the second application is to not use a VPN for communications.

12. The method of claim 10, wherein the first profile specifies communication or prohibits communication of data over a wireless network when the electronic device is roaming.

13. The method of claim 10, wherein the first network interface comprises a wireless local area network (WLAN) interface to communicate over a WLAN.

14. The method of claim 10, wherein the first network interface comprises a cellular network interface to communicate over a cellular network.

15. A non-transitory machine-readable storage medium comprising instructions that upon execution cause an electronic device to:

store, in a storage medium, information associating a first application of the electronic device with a first profile, and associating a second application of the electronic device with a second profile, the first profile selecting a first network interface of a plurality of network interfaces to use for communications, and the second profile selecting a second network interface of the plurality of network interfaces to use for communications, wherein the first profile contains first information specifying use of a first subscriber identity module (SIM) from among a plurality of SIMS for communications and specifying use of a first service set identifier (SSID) from among a plurality of SSIDs for communications, and the second profile contains second information specifying use of a second SIM from among the plurality of SIMs for communications and specifying use of a second SSID from among the plurality of SSIDs for communications;

during execution of the first application, select, based on the first profile associated with the first application, the first network interface for communication of the first application over a first network, the selecting of the first network interface responsive to the first profile containing the first information specifying use of the first SIM and specifying use of the first SSID, and during execution of the second application, select, based on the second profile associated with the second application, the second network interface for communication of the second application over a second network, the selecting of the second network interface responsive to the second profile containing the second information specifying use of the second SIM and specifying use of the second SSID.

16. The non-transitory machine-readable storage medium of claim 15, wherein the first profile specifies that the first application is to use a virtual private network (VPN) for communications, and the second profile specifies that the second application is to not use a VPN for communications.

17. The non-transitory machine-readable storage medium of claim 15, wherein the first network interface comprises:
   a wireless local area network (WLAN) interface to communicate over a WLAN, or
   a cellular network interface to communicate over a cellular network.

* * * * *